(12) United States Patent
Tanaka et al.

(10) Patent No.: US 11,352,529 B2
(45) Date of Patent: Jun. 7, 2022

(54) PACKAGE

(71) Applicant: ZEON CORPORATION, Tokyo (JP)

(72) Inventors: Hidekazu Tanaka, Tokyo (JP); Atsushi Sone, Tokyo (JP); Tamio Shikano, Tokyo (JP)

(73) Assignee: ZEON CORPORATION, Tokyo (JP)

(*) Notice: Subject to any disclaimer, the term of this patent is extended or adjusted under 35 U.S.C. 154(b) by 0 days.

(21) Appl. No.: 17/287,409

(22) PCT Filed: Oct. 31, 2019

(86) PCT No.: PCT/JP2019/042902
§ 371 (c)(1),
(2) Date: Apr. 21, 2021

(87) PCT Pub. No.: WO2020/091004
PCT Pub. Date: May 7, 2020

(65) Prior Publication Data
US 2021/0388242 A1    Dec. 16, 2021

(30) Foreign Application Priority Data

Nov. 2, 2018 (JP) .............................. JP2018-207615

(51) Int. Cl.
*B65D 85/10* (2006.01)
*C09J 11/08* (2006.01)
(Continued)

(52) U.S. Cl.
CPC ................ *C09J 11/08* (2013.01); *B65D 5/38* (2013.01); *B65D 5/6602* (2013.01); *B65D 33/18* (2013.01);
(Continued)

(58) Field of Classification Search
CPC ........ B65D 5/38; B65D 5/6602; B65D 27/14; B65D 33/18; B65D 77/10; B65D 77/2024;
(Continued)

(56) References Cited

U.S. PATENT DOCUMENTS 5,433,374 A * 7/1995 Forbes, Jr. ........... B65D 5/2047
229/123.2
5,533,612 A * 7/1996 Focke .................. B65D 5/6608
206/268
(Continued)

FOREIGN PATENT DOCUMENTS

JP    2013521195 A    6/2013
WO    2017188118 A1    11/2017

OTHER PUBLICATIONS

Apr. 27, 2021, International Preliminary Report on Patentability issued in the International Patent Application No. PCT/JP2019/042902.

*Primary Examiner* — Luan K Bui
(74) *Attorney, Agent, or Firm* — Kenja IP Law PC

(57) ABSTRACT

The present disclosure is directed to provide a package which enables repeated opening and sealing of an opening, and can be favorably closed by bringing a pair of resin adhesive parts into contact with each other while preventing sticking of materials to each resin adhesive part. A package of the present disclosure comprises a main body having an internal space and an opening in communication between the internal space and an outside; and a pair of, i.e., two, resin adhesive parts which are disposed so as to be capable of being brought into contact with each other for sealing the opening. Here, the 90-degree peel force between the pair of resin adhesive parts is 0.02 N or more, the coefficient of dynamic friction of each of the two resin adhesive parts is
(Continued)

1.50 or less, and the tack force of each of the two resin adhesive parts is 1.60 N or less.

7 Claims, 7 Drawing Sheets

(51) Int. Cl.
    *B65D 5/38*         (2006.01)
    *B65D 5/66*         (2006.01)
    *B65D 33/18*       (2006.01)
    *B65D 77/10*       (2006.01)
    *B65D 83/08*       (2006.01)
    *C09J 151/08*      (2006.01)

(52) U.S. Cl.
    CPC .......... *B65D 77/10* (2013.01); *B65D 83/0805* (2013.01); *B65D 85/10564* (2020.05); *C09J 151/08* (2013.01); *C09J 2301/408* (2020.08)

(58) Field of Classification Search
    CPC ........... B65D 83/0805; B65D 85/10564; C09J 11/08; C09J 151/08; C09J 2301/408
    USPC ..... 206/265, 268, 528; 220/315, 359.1, 810; 383/42, 61.1, 84, 86, 93, 95, 98, 99
    See application file for complete search history.

(56) References Cited

U.S. PATENT DOCUMENTS

| | | | |
|---|---|---|---|
| 5,647,671 A * | 7/1997 | May | B65D 33/2533 493/210 |
| 5,678,690 A * | 10/1997 | Belvederi | B65D 85/1056 206/268 |
| 6,691,886 B1 * | 2/2004 | Berndt | B65D 77/2032 220/315 |
| 2011/0210163 A1 | 9/2011 | Clark et al. | |
| 2012/0125932 A1 * | 5/2012 | Sierra-Gomez | B65D 75/5838 220/255 |
| 2015/0131926 A1 * | 5/2015 | Lux | B65D 77/14 383/89 |
| 2019/0092986 A1 | 3/2019 | Sone | |

\* cited by examiner

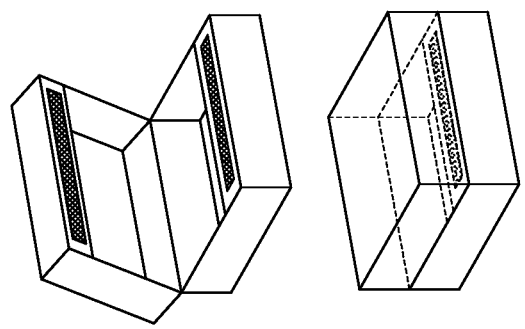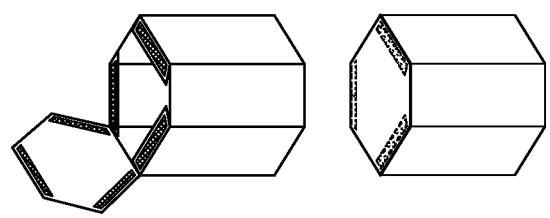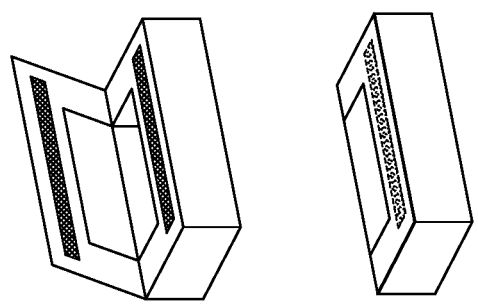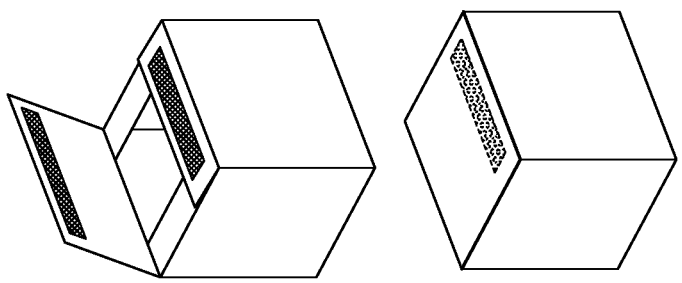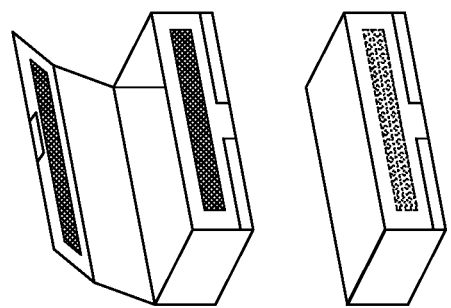

PACKAGE

TECHNICAL FIELD

The present disclosure relates particularly to a package which enables repeated opening and sealing.

BACKGROUND

Packages for certain products, such as foods, favorable items, medicines, and daily necessities, are routinely subjected to repeated actions of opening and sealing the packages so that a required amount of an item stored in the packages are taken out from the packages while the remainder remains stored in the packages. Packages used in such products need to be suitably sealed for preventing the contained item from contaminated by foreign matters from the outside or scattering to the outside, as well as capable of being easily opened for taking out the content.

In light of such a demand, efforts have been made to develop packages which enable repeated opening and sealing. Specifically, a technique has been proposed in which adhesive parts (hereinafter referred to as "resin adhesive parts") made of a resin are provided in a package so that the resin adhesive parts can be brought into contact with and separated from each other to enable repeated opening and sealing of the package (see PTL 1, for example).

CITATION LIST

Patent Literature

PTL 1: JP 2013-521195 A

SUMMARY

Technical Problem

The above-described conventional package has a drawback in that materials, such as a part of the item contained in the package or foreign matters from the outside, may stick to the resin adhesive parts.

Accordingly, there remains room for improvement in the above-described conventional packages in that adhesiveness between the resin adhesive parts is ensured to enable the opening to be sealed while preventing sticking of materials to the resin adhesive parts.

Accordingly, it would thus be helpful to provide a solution which beneficially provides this improvement.

Solution to Problem

The inventors conducted extensive studies to solve the aforementioned problem. The inventors then paid attention to the properties of resin adhesive parts of packages. Specifically, the inventors paid attention to the fact that an adhesive force enabling sealing of an opening of a package correlated with the 90-degree peel force between a pair of resin adhesive parts which were adhered to each other. The inventors then discovered that good sealing of the opening could be achieved by adjusting the 90-degree peel force to be equal to or greater than a predetermined value, and at the same time, sticking of materials to the resin adhesive parts could be prevented by adjusting the coefficients of dynamic friction and the tack forces of the resin adhesive parts to be equal to or lower than their respective predetermined values, thereby completing the present disclosure.

Specifically, the present disclosure aims to advantageously solve the problems set forth above by disclosing a package comprising: a main body having an internal space and an opening in communication between the internal space and an outside; and a pair of resin adhesive parts disposed so as to be capable of being brought into contact with each other for sealing the opening, a 90-degree peel force between the pair of resin adhesive parts adhered to each other being 0.02 N or more, a coefficient of dynamic friction of each of the two resin adhesive part configuring the pair of resin adhesive parts being 1.50 or less, and a tack force of each of the two resin adhesive part configuring the pair of resin adhesive parts being 1.60 N or less. The package comprising a pair of resin adhesive parts in which the 90-degree peel force between the resin adhesive parts adhered to each other is equal to or higher than the above-described value, and the coefficient of dynamic friction and the tack force of each resin adhesive part are equal to or lower than the above-described values can provide good adhesion between the resin adhesive parts for sealing the opening while preventing sticking of materials to each resin adhesive part.

As used herein, the "90-degree peel force of a pair of resin adhesive parts adhered to each other" is a value measured after the resin adhesive parts configuring the pair of resin adhesive parts are cut into pieces of a predetermined size and the cut pieces are then adhered to each other. Specifically, it can be measured by the method described in the EXAMPLES section of the present specification.

Further, as used herein, the "coefficient of dynamic friction" of a resin adhesive part is a value measured according to a JIS K 7125 as a coefficient of dynamic friction between a resin adhesive part and a sheet of carton paper. Specifically, it can be measured by the method described in the EXAMPLES section of the present specification.

Further, as used herein, the "tack force" of a resin adhesive part can be measured by a method described in the EXAMPLES section of the present specification.

Further, in the package of the present disclosure, the resin adhesive parts are preferably made of a cured product of a resin composition comprising a resin, a curing agent capable of curing the resin, and a silicone-based surface modifier. The above-described cured product of the resin composition used as each resin adhesive part can sufficiently prevent sticking of materials to each resin adhesive part.

Here, in the package of the present disclosure, a content of the silicone-based surface modifier in the resin composition is preferably 0.05 parts by mass or more and 0.6 parts by mass or less per 100 parts by mass of the resin. The cured product of the resin composition containing the above-described amount of the silicone-based surface modifier used as each resin adhesive part can further prevent sticking of materials to each resin adhesive part while enabling sealing of the opening sufficiently satisfactorily.

Further, in the package of the present disclosure, the silicone-based surface modifier is preferably a polydimethylsiloxane-based surface modifier. The cured product of the resin composition containing the polydimethylsiloxane-based surface modifier used as each resin adhesive part can further prevent sticking of materials to each resin adhesive part.

Further, the package of the present disclosure may further comprises a lid, wherein one resin adhesive part of the pair of resin adhesive parts may be disposed on a surface of the main body, and the other resin adhesive part may be disposed on a surface of the lid.

Further, in the package of the present disclosure, both of the two resin adhesive parts configuring the pair of resin adhesive parts may be disposed on the surface of the main body.

The package of the present disclosure is a package for tobacco or cigarettes, a package for confectionery, a package for coffee beans or powders, a package for tea leaves, and a package for detergent, for example.

Advantageous Effect

According to the present disclosure, it is possible to provide a package which enables repeated opening and sealing of an opening, and which can be favorably closed by bringing a pair of resin adhesive parts into contact with each other while preventing sticking of materials to each resin adhesive part.

BRIEF DESCRIPTION OF THE DRAWINGS

In the accompanying drawings:

FIGS. 5A to 5E are perspective views illustrating packages according to an embodiment of the present disclosure, wherein the upper parts illustrate opened positions and the lower parts illustrate closed positions;

DETAILED DESCRIPTION

Figure 1A:
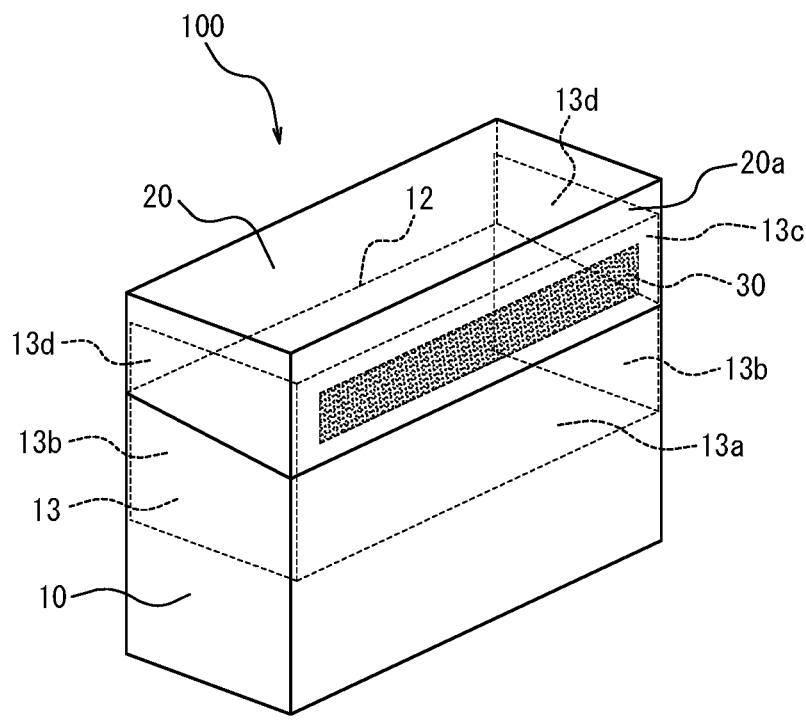
FIG. 1A is a perspective view illustrating a package 100 according to one embodiment of the present disclosure in the closed position.

Embodiments of the present disclosure will be described in detail below. Here, the package of the present disclosure comprises a main body having an internal space capable of containing an item and an opening in communication between the internal space and an outside. In the package of the present disclosure, a pair of resin adhesive parts are disposed so as to be capable of being brought into contact with each other. In the package of the present disclosure, the opening in the main body can be sealed by bringing the pair of resin adhesive parts into contact with each other.

[Resin Adhesive Parts]

The pair of resin adhesive parts provided in the package of the present disclosure are the regions where an adhesive force may be manifested when the resin adhesive parts are brought into contact with each other, so that the opening in the package can be suitably sealed by this adhesive force.

One of the major characteristics of the pair of resin adhesive parts provided in the package of the present disclosure is that the 90-degree peel force between the resin adhesive parts adhered to each other is 0.02 N or more, the coefficient of dynamic friction of each of the two resin adhesive part configuring the pair of resin adhesive parts is 1.50 or less, and the tack force of each of the two resin adhesive part configuring the pair of resin adhesive parts is 1.60 N or less.

The pair of resin adhesive parts having the above-described properties manifest a good adhesive force when the resin adhesive parts are brought into contact with each other. Nevertheless, the adhesive force is weak for a part of an item contained in the package or foreign matters from the outside, so that sticking of such materials is thus prevented.

It is suffice that the package of the present disclosure is provided with at least a pair of resin adhesive parts having the above-described properties. In other words, the package of the present disclosure may be provided with multiple pairs of resin adhesive parts having the above-described properties, wherein a pair of resin adhesive parts having the above-described properties and one or more pairs of resin adhesive parts without the above-described properties may be provided.

Further, the two resin adhesive parts configuring the pair of resin adhesive parts may be spaced apart from each other or may be continuous. (For example, the two resin adhesive parts may be composed of a single band-shaped continuous film member, and the band-shaped film member may be folded back substantially at the center in the stretching direction of the band-shaped film so that the two resin adhesive parts can be brought into contact with each other.)

<90-Degree Peel Force>

Here, the 90-degree peel force between the pair of resin adhesive parts adhered to each other is required to be 0.02 N or more as described above, and is preferably 0.031 N or more, and preferably 0.15 N or less, more preferably 0.12 N or less, even more preferably 0.10 N or less, and particularly preferably 0.04 N or less. When the 90-degree peel force of the pair of resin adhesive parts is less than 0.02 N, a sufficient adhesive force may not be manifested by a contact, making it unable to provide suitable sealing of the opening. On the contrary, when the 90-degree peel force between the pair of resin adhesive parts is 0.15 N or less, the resin adhesive parts adhered to each other can be easily separated and the opening in the sealed state can be opened sufficiently favorably.

The 90-degree peel force can be adjusted, for example, by adjusting the blend of components in resin compositions used for preparing the two resin adhesive parts configuring the pair of resin adhesive parts or adjusting the preparation conditions for preparing the resin adhesive parts. Specifically, the 90-degree peel force can be improved by using the same or similar resins (in terms of the composition of monomers or the like) for the resin compositions used for preparing the two resin adhesive parts. Further, the 90-degree peel force can be reduced by increasing the amount of a curing agent in the resin compositions used for preparing the two resin adhesive parts.

<Coefficient of Dynamic Friction>

Further, the coefficient of dynamic friction of each of the two resin adhesive parts configuring the pair of resin adhesive parts is required to be 1.50 or less as described above, and is preferably 1.30 or less, more preferably 1.10 or less, even more preferably 0.80 or less, particularly preferably 0.54 or less, and preferably 0.10 or more, more preferably 0.20 or more, even more preferably 0.30 or more, and particularly preferably 0.40 or more. When the coefficients of dynamic friction of the resin adhesive parts exceed 1.50, sticking of materials to the resin adhesive parts cannot be prevented. On the contrary, when the coefficients of dynamic friction of the resin adhesive parts are 0.10 or more, unintentional separation of the pair of resin adhesive parts caused by a lateral displacement of the pair of resin adhesive parts is prevented when the package in the closed state is subjected to an impact.

The coefficients of dynamic friction of the resin adhesive parts can be adjusted, for example, by adjusting the blend of components in resin compositions used for preparing the resin adhesive parts or adjusting the preparation conditions for preparing the resin adhesive parts. Specifically, the coefficients of dynamic friction can be reduced by blending a surface modifier such as a silicone-based surface modifier into the resin compositions used for preparing the resin adhesive parts.

<Tack Force>

Further, the tack force of the surface of each of the two resin adhesive parts configuring the pair of resin adhesive parts is required to be 1.60 N or less as described above, and is preferably 1.47 N or less, more preferably 1.35 N or less, even more preferably 0.99 N or less, and preferably 0.10 N or more. When the tack forces of the resin adhesive parts exceed 1.60 N, sticking of materials to the resin adhesive parts cannot be prevented. On the contrary, when the tack forces of the resin adhesive parts are 0.10 N or more, good adhesion can be sufficiently readily achieved between the resin adhesive parts to seal the opening even favorably.

The tack forces of the resin adhesive parts can be adjusted, for example, by adjusting the blend of components in resin compositions used for preparing the resin adhesive parts or adjusting the preparation conditions for preparing the resin adhesive parts. For example, the tack forces can be reduced by increasing the amount of a curing agent in the resin compositions used for preparing the resin adhesive parts.

<Composition and Preparation Method of Resin Adhesive Parts>

The resin adhesive parts are not particularly limited as long as the resin adhesive parts have the above-described properties, and cured products of a resin composition containing a resin can be used. For example, the resin adhesive parts can be produced by curing a resin composition containing a resin, a curing agent capable of curing the resin, and a silicone-based surface modifier. It is to be noted that the resin composition may contain an additive (optional additive) other than the resin, the curing agent, and the silicone-based surface modifier.

<<Resin>>

Examples of the resin include, but are not particularly limited to, a (meth)acrylic acid ester copolymer resin, a polyurethane resin, a polyester resin, and a urethane acrylate-based resin. One resin may be used alone, or two or more resins may be used in combination. The resin is preferably a urethane acrylate-based resin, and more preferably an ultraviolet curable urethane acrylate-based resin from the viewpoint that it facilitates formation of thin resin adhesive parts.

In the present disclosure, "(meth)acryl" is used to indicate "acryl" and/or "methacryl".

The resin has a glass-transition temperature of preferably −30° C. or higher, and preferably 5° C. or lower and more preferably 0° C. or lower. When the glass-transition temperature of the resin is −30° C. or higher, the resin adhesive parts adhered to each other can be easily separated so that the opening in the sealed state can be opened sufficiently favorably. When the glass-transition temperature is 5° C. or lower, a sufficiently high adhesive force may be manifested by a contact between the resin adhesive parts so that the opening in the package can be suitably sealed even in a cold environment.

In the present disclosure, the glass-transition temperature of the resin can be measured in accordance with JIS K7121.

<<Curing Agent>>

The curing agent is not particularly limited as long as the curing agent is capable of curing the above-described resin. For example, a known cross-linking agent or a photopolymerization initiator can be used.

Specifically, examples of the curing agent includes, for example, multifunctional acrylate-based cross-linking agents such as trimethylolpropane triacrylate and trimethylolpropane ethylene oxide-modified triacrylate; carbodiimide-based cross-linking agents; epoxy-based cross-linking agents such as polyethylene glycol diglycidyl ether, glycerin polyglycidyl ether, sorbitol polyglycidyl ether, and bisphenol A polyglycidyl ether; aziridine-based cross-linking agents such as an ethyleneimine derivative of an aldehyde (e.g., acrolein); polyfunctional isocyanate-based cross-linking agents such as tolylene diisocyanate, trimethylolpropane tolylene diisocyanate, and diphenylmethane triisocyanate; oxazoline-based cross-linking agents; metal salt-based cross-linking agents; metal chelate-based cross-linking agents; peroxide-based cross-linking agents; and photopolymerization initiators such as benzophenone-based, acetophenone-based, thioxanthone-based, sulfonium-based, and iodonium-based photopolymerization initiators. One curing agent may be used alone, or two or more curing agents may be used in combination. The curing agent is preferably a multifunctional acrylate-based cross-linking agent.

The resin composition preferably contains 6 parts by mass or more, more preferably 8 parts by mass or more, even more preferably 10 parts by mass or more, particularly preferably 11 parts by mass or more, and preferably 19 parts by mass or less, more preferably 16 parts by mass or less, even more preferably 15 parts by mass or less, and particularly preferably 13 parts by mass or less of the curing agent per 100 parts by mass of the resin. When the content of the curing agent in the resin composition is 6 parts by mass or more per 100 parts by mass of the resin, the strengths of the resin adhesive parts which are cured products of the resin composition are ensured and sticking of materials to the resin adhesive parts can be further prevented. On the contrary, when the content of the curing agent in the resin composition is 19 parts by mass or less per 100 parts by mass of the resin, a further higher adhesive force is manifested by a contact between the resin adhesive parts which are cured products of the resin composition, thereby providing more favorable sealing of the opening.

<<Silicone-Based Surface Modifier>>

The resin composition preferably contains a silicone-based surface modifier. Examples of the silicone-based surface modifier include polymers having a polysiloxane structure such as polydimethylsiloxane, polydiethylsiloxane, and poly(methylethyl)siloxane, and modified products thereof. One silicone-based surface modifier may be used alone, or two or more silicone-based surface modifier may be used in combination. Polydimethylsiloxane and a modified product thereof (polydimethylsiloxane-based surface modifier) are particularly preferred as the silicone-based surface modifier from the viewpoint of further preventing sticking of materials to the resin adhesive parts.

The resin composition preferably contains 0.05 parts by mass or more, more preferably 0.1 parts by mass or more, even more preferably 0.15 parts by mass or more, and preferably 0.6 parts by mass or less, more preferably 0.4 parts by mass or less, and even more preferably 0.3 parts by mass or less of the silicone-based surface modifier per 100 parts by mass of the resin. When the content of the silicone-based surface modifier in the resin composition is 0.05 parts by mass or more per 100 parts by mass of the resin, sticking of materials to the resin adhesive parts which are cured products of the resin composition can be further prevented. On the contrary, when the content of the silicone-based surface modifier in the resin composition is 0.6 parts by mass or less per 100 parts by mass of the resin, a further higher adhesive force is manifested by a contact between the resin adhesive parts which are cured products of the resin composition, thereby providing more favorable sealing of the opening.

It is to be noted that each of the resin adhesive parts provided in the package of the present disclosure preferably contains 0.05% by mass or more, more preferably 0.07% by mass or more, and preferably 0.50% by mass or less, more preferably 0.30% by mass or less of the silicone-based surface modifier, when the mass of the each resin adhesive part is taken to be 100% by mass. When the proportion of the silicone-based surface modifier contained the resin adhesive part is 0.05% by mass or more, sticking of materials to the resin adhesive parts can be further prevented. On the contrary, when the proportion of the silicone-based surface modifier contained the resin adhesive part is 0.50% by mass or less, a high adhesive force can be manifested by a contact between the resin adhesive parts, thereby providing more favorable sealing of the opening in the package.

In the present disclosure, the proportion of the silicone-based surface modifier contained the resin adhesive part can be measured by a method using the nuclear magnetic resonance (NMR) technique described in the EXAMPLE section described later.

<<Optional Additives>>

Optional additives that can be optionally blended in the composition are not limited, and known additives may be used. Examples of known additives include foam stabilizers, auxiliary blowing agents, thickeners, fillers, antiseptics, fungicides, gelatinizers, flame retardants, anti-aging agents, antioxidants, tackifiers, photosensitizers, and conductive compounds. Additives are not particularly limited, and those described in WO 2017/188118 A1 can be used, for example. One of these additives may be used alone, or two or more of these may be used in combination.

<<Preparation and Curing of Resin Composition>>

The method to prepare the resin composition is not particularly limited, and the resin composition can be obtained by mixing the above-described components in a known technique. Further, a method to cure the resin composition is not particularly limited, and the resin composition can be cured by a known technique such as ultraviolet irradiation. Although the resin composition can be foamed prior to curing the resin composition, the resin composition is preferably not foamed in the present disclosure. This is because the resin adhesive parts obtained as cured products which have been subjected to the step of foaming the resin composition may have impaired transparency and foaming may cause fine irregularities on the surface which may make the surface prone to stick materials.

The shape of the resin adhesive parts obtained as described above is not particularly limited. Nevertheless, the resin adhesive parts are preferably film members having a certain shape such as a band shape from the viewpoint of reducing the weight of the package and ensuring a sufficient contact area between the resin adhesive parts.

The thickness of the resin adhesive part is not particularly limited, but is preferably 5 µm or more and 50 µm or less from the viewpoint of reducing the weight of the package and ensuring the strengths of the resin adhesive parts.

[Package]

The structure of the package of the present disclosure including the above-described resin adhesive parts will be described with reference to specific embodiments. The package of the present disclosure, however, is not limited thereto. It is to be noted that "resin adhesive parts" mentioned in the following description have been described above in the "(Resin adhesive part)" section and a description thereof will thus be omitted in this section.

First Embodiment

A package of a first embodiment of the present disclosure includes a main body having an internal space and an opening in communication between the internal space and an outside, a lid capable of covering the opening in the main body, and a pair of resin adhesive parts disposed so as to be capable of being brought into contact with each other for sealing the opening, wherein one resin adhesive part of the pair of resin adhesive parts is disposed on the surface of the main body, and the other resin adhesive part is disposed on the surface of the lid.

Hereinafter, the first embodiment of the package of the present disclosure will be described more specifically with reference to drawings.

Specifically, an example of the first embodiment of the package of the present disclosure has a configuration as illustrated in FIG. 1, for example.

Figure 1B:
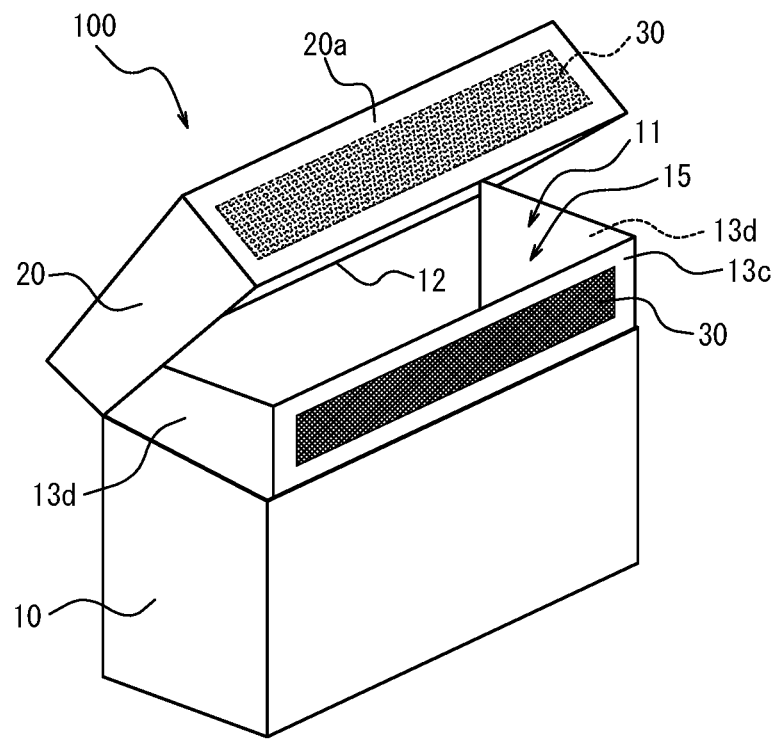
FIG. 1B is a perspective view illustrating the package in the opened position.

FIG. 1A is a perspective of a package 100 in the closed position, and FIG. 1B is a perspective of the package 100 in the opened position. The package 100 includes a box-shaped main body 10 provided with an opening 11 in communication between an internal space 15 and the outside, and a lid 20 for covering the opening 11 of the main body 10. The main body 10 and the lid 20 connect along at an upper edge 12 of the main body 10. The lid 20 is a hinged lid. The closed position and the opened position can be switched upon a rotation of the lid 20 around the upper edge 12.

The main body 10 includes a collar 13 that partially adheres to an inner face of the main body 10, and partially protrudes outward from the opening 11 of the main body 10. The collar 13 includes: an inner front wall 13a and inner side walls 13b which adhere to the inner face of the main body 10, and an outer front wall 13c and outer side walls 13d which protrude outward from the opening 11 of the main body 10. A resin adhesive part 30 is adhered and fixed to the front surface of the inner front wall 13a of the collar 13.

A resin adhesive part 30 is adhered and fixed to the rear surface of the front wall 20a of the lid 20.

In the closed position of the package 100, the main body 10 and the lid 20 are in contact with each other with the aid of the resin adhesive part 30 provided on the outer front wall 13c of the main body 10 and the resin adhesive part 30 provided on the front wall 20a of the lid 20. A contact between of the pair of resin adhesive parts 30 can provide favorable sealing of the opening 11 of the main body 10 with the lid 20.

Alternatively, an example of the first embodiment of the package of the present disclosure has a configuration as illustrated in FIG. 2, for example.

Figure 2A:
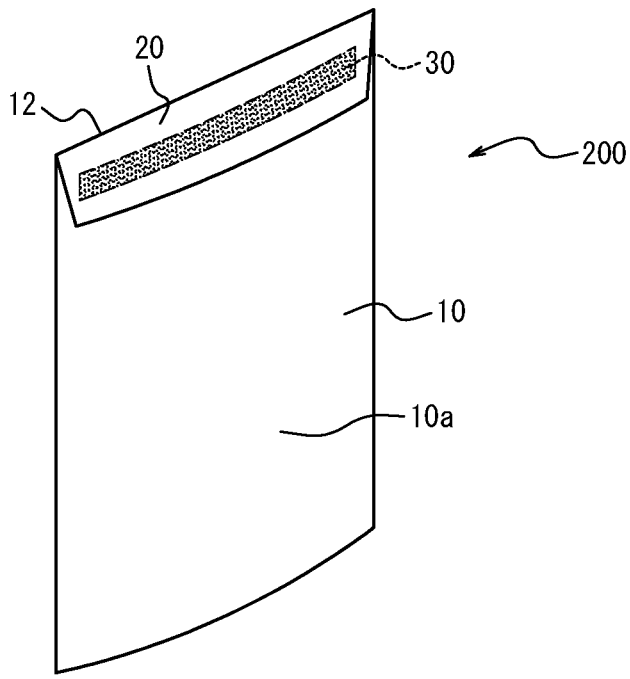
FIG. 2A is a perspective view illustrating a package 200 according to one embodiment of the present disclosure in the closed position.
Figure 2B:
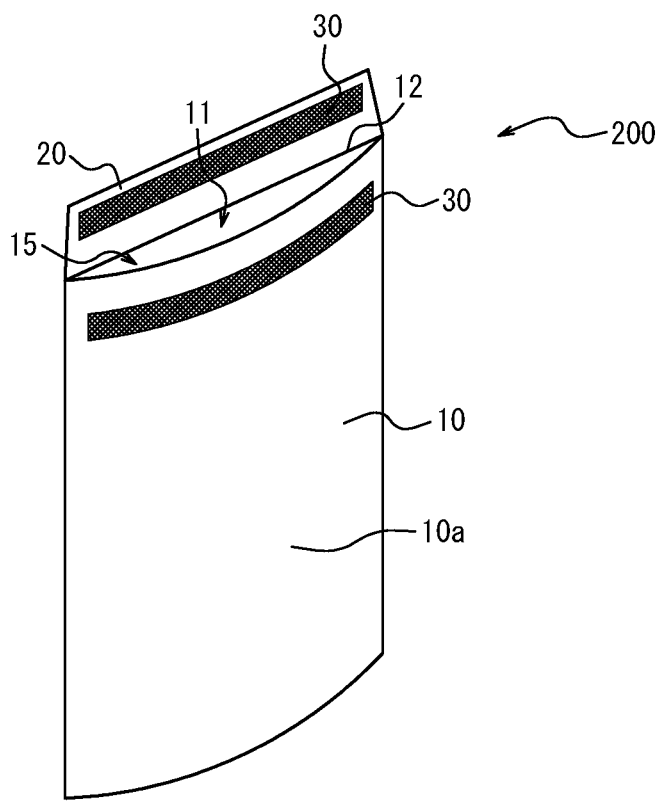
FIG. 2B is a perspective view illustrating the package in the opened position.

FIG. 2A is a perspective of a package 200 in the closed position, and FIG. 2B is a perspective of the package 200 in the opened position. The package 20 is an envelope-shaped package. Here, the package 200 includes a main body 10 provided with an opening 11 in communication between an internal space 15 and the outside, and a lid (flap) 20 for covering the opening 11 of the main body 10. The main body 10 and the lid 20 connect along at an upper edge 12 of the main body 10. The package 200 can be switched between the closed position and the opened position upon folding and folding-back of the lid 20 around the upper edge 12.

A resin adhesive part 30 is adhered and fixed to the front surface of the front wall 10a of the main body 10. Further, a resin adhesive part 30 is adhered and fixed to the surface of the lid 20. In the closed position of the package 200, the main body 10 and the lid 20 are in contact with each other with the aid of the resin adhesive part 30 provided on the front wall 10a of the main body 10 and the resin adhesive part 30 provided on the surface of the lid 20. A contact between of the pair of resin adhesive parts 30 can provide favorable sealing of the opening 11 of the main body 10 with the lid 20.

Further alternatively, an example of the first embodiment of the package of the present disclosure has a configuration as illustrated in FIG. 3, for example.

Figure 3A:
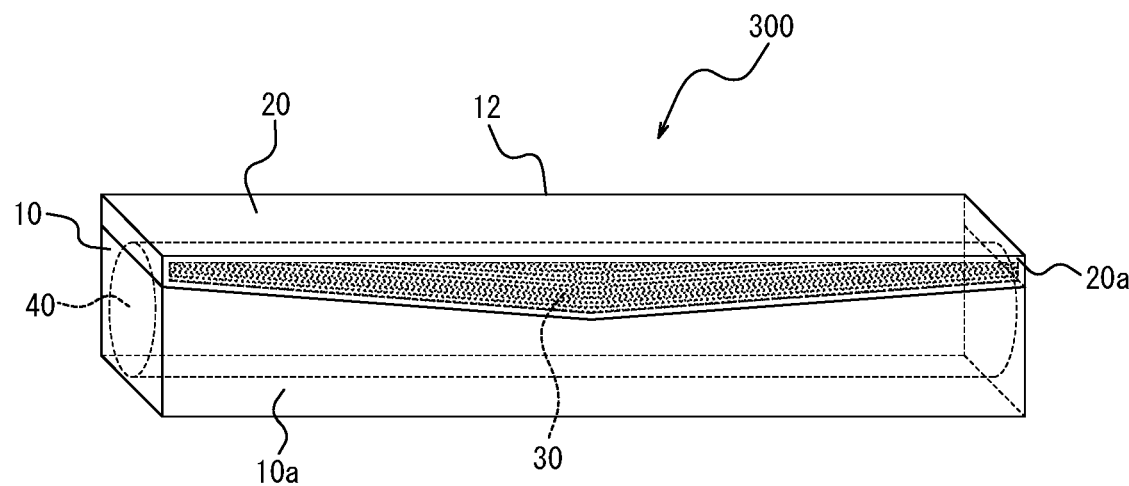
FIG. 3A is a perspective view illustrating a package 300 according to one embodiment of the present disclosure in the closed position.
Figure 3B:
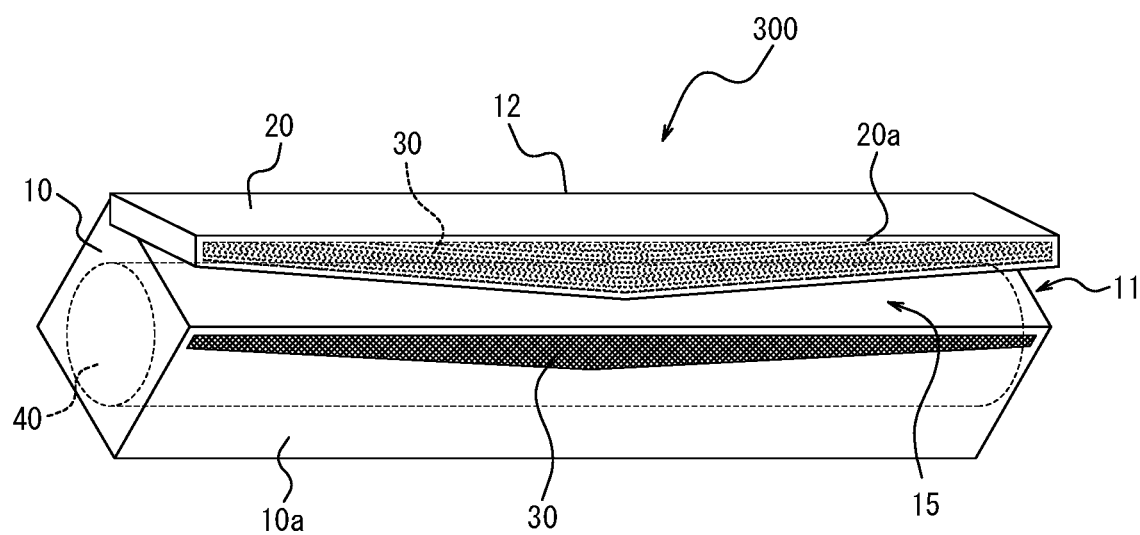
FIG. 3B is a perspective view illustrating the package in the opened position.

FIG. 3A is a perspective of a package 300 in the closed position, and FIG. 3B is a perspective of the package 300 in the opened position. The package 300 includes a box-shaped main body 10 provided with an opening 11 in communication between an internal space 15 and the outside, and a lid 20 for covering the opening 11 of the main body 10. The main body 10 and the lid 20 connect along at an upper edge 12 of the main body 10. In the package 300, the lid 20 is a hinged lid. The package 300 can be switched between the closed position and the opened position upon a rotation of the lid 20 around the upper edge 12. Wrapping film 40 is stored in the package 300.

A resin adhesive part 30 is adhered and fixed to the front surface of the front wall 10a of the main body 10. Further, a resin adhesive part 30 is adhered and fixed to the rear surface of the front wall 20a of the lid 20. In the closed position of the package 300, the main body 10 and the lid 20 are in contact with each other with the aid of the resin adhesive part 30 provided on the front wall 10a of the main body 10 and the resin adhesive part 30 provided on the front wall 20a of the lid 20. A contact between of the pair of resin adhesive parts 30 can provide favorable sealing of the opening 11 of the main body 10 with the lid 20.

Alternatively, an example of the first embodiment of the package of the present disclosure has a configuration as illustrated in FIG. 4, for example.

Figure 4A:
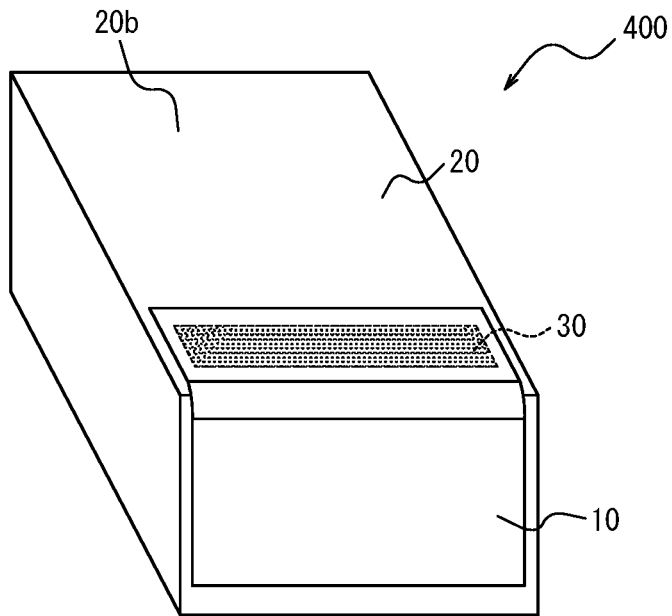
FIG. 4A is a perspective view illustrating a package 400 according to one embodiment of the present disclosure in the closed position.
Figure 4B:
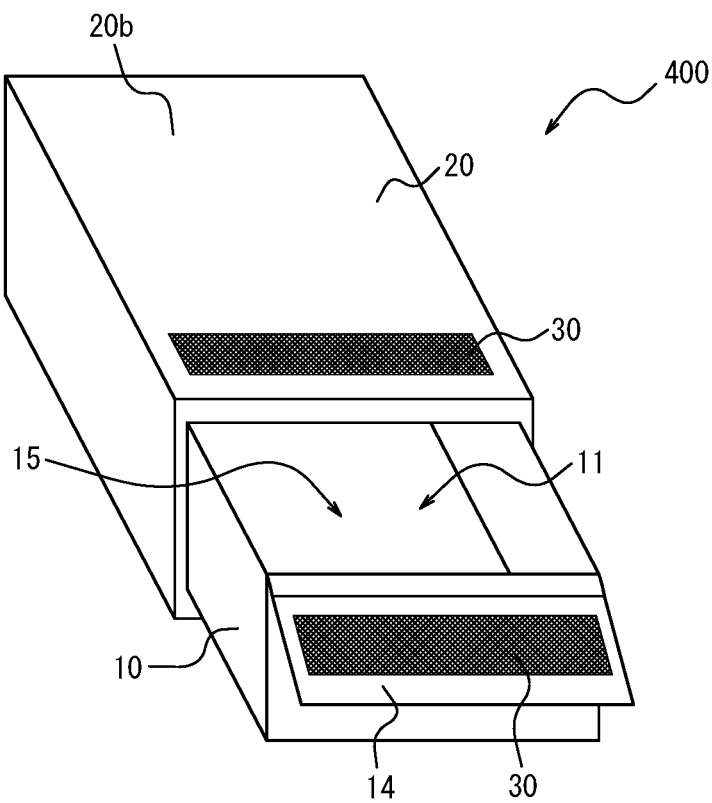
FIG. 4B is a perspective view illustrating the package in the opened position.

FIG. 4A is a perspective of a package 400 in the closed position, and FIG. 4B is a perspective of the package 400 in the opened position. The package 400 is a sliding-type box (slide box). Here, the package 400 includes a box-shaped main body (inner box) 10 provided with an opening 11 in communication between an internal space 15 and the outside, and has a rotation piece 14 along an end part of the inner box which is rotatable in a way of a hinge, and a lid (outer box) 20 for covering the opening 11 of the main body 10. The lid (outer box) 20 has a space capable of accommodating the main body (inner box) 10. The package 400 can be switched between the opened position and the closed position upon sliding of at least one of the body 10 and the lid 20.

A resin adhesive part 30 is adhered and fixed to the surface of the rotation piece 14 of the main body 10 with which the exterior of the upper wall 20b of the lid 20 can contact. Further, a resin adhesive part 30 is adhered and fixed to the exterior of the upper wall of the lid 20. In the closed position of the package 400, the main body 10 and the lid 20 are in contact with each other with the aid of the resin adhesive part 30 provided on the rotation piece 14 of the main body 10 and the resin adhesive part 30 provided on the upper wall 20b of the lid 20. A contact between of the pair of resin adhesive parts 30 can provide favorable sealing of the opening 11 of the main body 10 with the lid 20.

Although the first embodiment of the package of the present disclosure has been described above with reference to the multiple examples, the first embodiment of the package of the present disclosure is not limited to the above-described configurations. Examples of the first embodiment of the package of the present disclosure include those illustrated in FIGS. 5A to 5E, for example. Here, FIG. 5A illustrates a front fastening-type package, FIGS. 5B and 5C illustrate top fastening-type packages, FIG. 5D illustrates a hexagonal box-shaped package, and FIG. 5E illustrates a package composed of two boxes. The upper parts of FIGS. 5A to 5E illustrate the opened positions of the packages whereas the lower parts illustrate the closed positions of the packages.

Second Embodiment

A package of a second embodiment of the present disclosure includes a main body having an internal space and an opening in communication between the internal space and an outside, and a pair of resin adhesive parts disposed so as to be capable of being brought into contact with each other for sealing the opening, wherein both of the resin adhesive parts configuring the pair of resin adhesive parts are disposed on the surface of the main body.

Hereinafter, the second embodiment of the package of the present disclosure will be described more specifically with reference to a drawing.

Specifically, an example of the second embodiment of the package of the present disclosure has a configuration as illustrated in FIG. 6, for example.

Figure 6A:
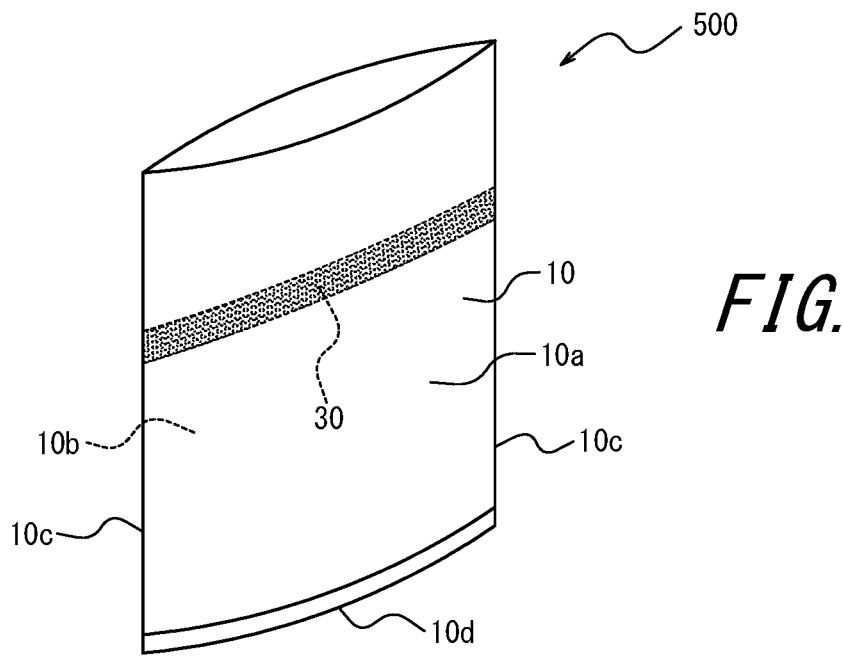
FIG. 6A is a perspective view illustrating a package 500 according to one embodiment of the present disclosure in the closed position.
Figure 6B:
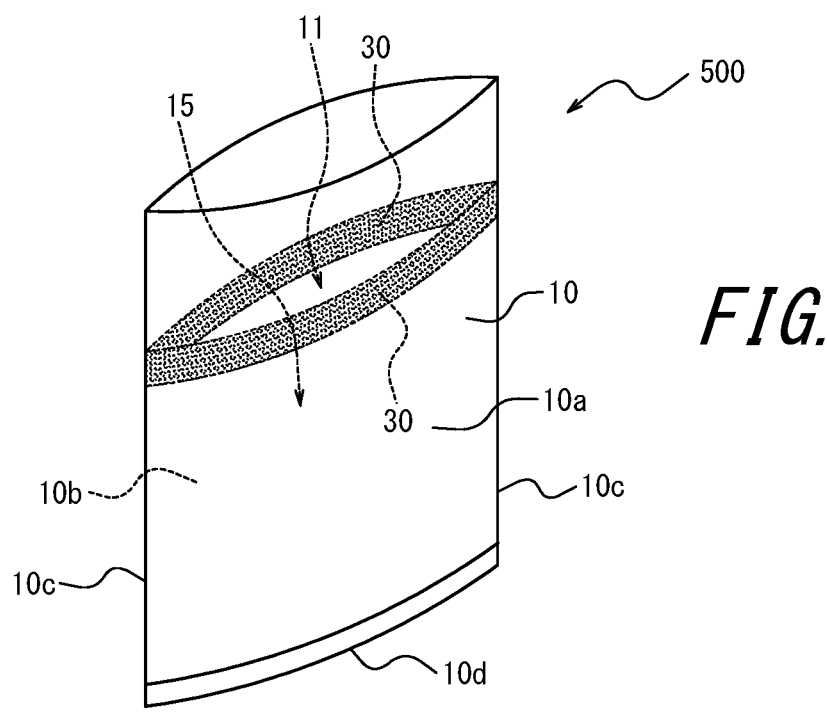
FIG. 6B is a perspective view illustrating the package in the opened position.

FIG. 6A is a perspective of a package 500 in the closed position, and FIG. 6B is a perspective of the package 500 in the opened position. The package 500 is a bottom sealed bag-type container. Here, the package 500 includes an front wall 10a and a rear wall 10b which oppose one another. The front wall 10a and the rear wall 10b connect along side edges 10c on the both sides and a bottom edge 10d. An internal space 15 is defined between the front wall 10a and the rear wall 10b. The package 500 has an opening 11 in communication between the internal space 15 and the outside. In the package 500, at least one of the front wall 10a and the rear wall 10b is made of a material which is deformable when being pressed or subjected to any other force in the direction of the internal space 15 of the package 500. The package 500 can be switched between the closed position and the open position upon a deformation of at least one of the front wall 10a and the rear wall 10b.

A resin adhesive part 30 is provided to the front wall 10a of the main body 10 on the interior side of the package, whereas a resin adhesive part 30 is adhered and fixed to the rear wall 10b of the main body 10 also on the interior side of the package. In the closed position of the package 500, the front wall 10a and the rear wall 10b are in contact with each other with the aid of the resin adhesive part 30 provided on the front wall 10a and the resin adhesive part 30 provided on the rear wall 10b. A contact between of the pair of resin adhesive parts 30 can provide favorable sealing of the opening 11 of the main body 10 with the front wall 10a and the rear wall 10b.

Although the second embodiment of the package of the present disclosure has been described with reference to the example, the second embodiment of the package of the present is not limited to the above-described configuration.

In the package of the present disclosure, the material of members other than the above-described resin adhesive parts (e.g., the main body and the lid) are not particularly limited as long as the resin adhesive parts can be adhered and fixed to such members, but they can be made of a resin, a metal, or paper, for example. In other words, a main body made of a resin, a metal, or paper can be used, and a lid made of a resin, a metal, or paper can be used, for example, in the package of the present disclosure.

Further, the resin adhesive parts can be adhered and fixed to the members by applying a resin composition directly on members (e.g., the main body and the lid) and curing the resin composition, for example, in the package of the present disclosure. Alternatively, the resin adhesive parts can be adhered and fixed to the members by curing a resin composition coated on a known base material to prepare laminates (each having a resin adhesive part on the base material) and adhering the base material sides of the laminates to the surfaces of the members with an adhesive tape or other means.

It is to be noted that the resin adhesive parts may be adhered and fixed to the members before or after the package is assembled.

The item which can be stored in the internal space of the package of the present disclosure is not particularly limited, and examples thereof include tobacco and cigarettes, confectionery, coffee beans and powders, tea leaves, and detergents. Stated differently, applications of the package of the present disclosure are not particularly limited, and examples include a package for tobacco or cigarettes, a package for confectionery, a package for coffee beans or powders, a package for tea leaves, or a package for detergent, for example.

EXAMPLES

The following provides more specific description of the present disclosure with reference to examples. However, the present disclosure is not limited to these examples. In the following description, "%" and "parts" used in expressing quantities are by mass, unless otherwise specified.

In examples and comparative examples, 90-degree peel forces of pairs of resin adhesive parts adhered to each other, coefficients of dynamic friction and tack forces of the resin adhesive parts, proportions of a silicone-based surface modifier contained the resin adhesive parts, and the adhesiveness and openability between the resin adhesive parts of packages, and the resistance against sticking of materials to the resin adhesive parts were measured and evaluated using the following methods. It is to be noted that the results are all summarized in Table 1 or Table 2

<90-Degree Peel Force>

A first laminate (including a resin adhesive part and a sheet of carton paper serving as a base material) prepared in each of the examples and comparative examples was cut out into a piece having dimensions of 50 mm in width×125 mm in length. The base material side of the cut-out piece was bonded to a substrate (aluminum plate of 50 mm in width× 125 in length) with a double-sided adhesive tape manufactured by NICHIBAN Co., Ltd. under the trade name of NICETACK® NW-15S (NICETACK is a registered trademark in Japan, other countries, or both) to obtain a laminated body.

A second laminate prepared in each of the examples and comparative examples (including a resin adhesive part and a PET film having a corona-treated surface serving as a base material) was cut out into a piece having dimensions of 25 mm in width×120 mm in length. The resultant cut-out piece and the above-mentioned laminated body were bonded to each other so that the resin adhesive parts were in contact with each other, and were pressed from the top by a loading roller of 2.0 kgf (19.6133 N) which was reciprocated once to obtain a test piece.

The resultant test piece was subjected to a 90-degree peel test at a speed of 300 mm/minute using an adhesive and coating peel analyzer manufactured by Kyowa Interface Science Co., Ltd., under the trade name of VPA-S in the environment of 23° C. and 50% RH to measure a 90-degree peel force.

<Coefficient of Dynamic Friction>

Using each first laminate (including the resin adhesive part and the sheet of carton paper serving as a base material), the coefficient of dynamic friction between the resin adhesive part and the sheet of carton paper was measured in accordance with JIS K 7125 as follows.

Figure 7:
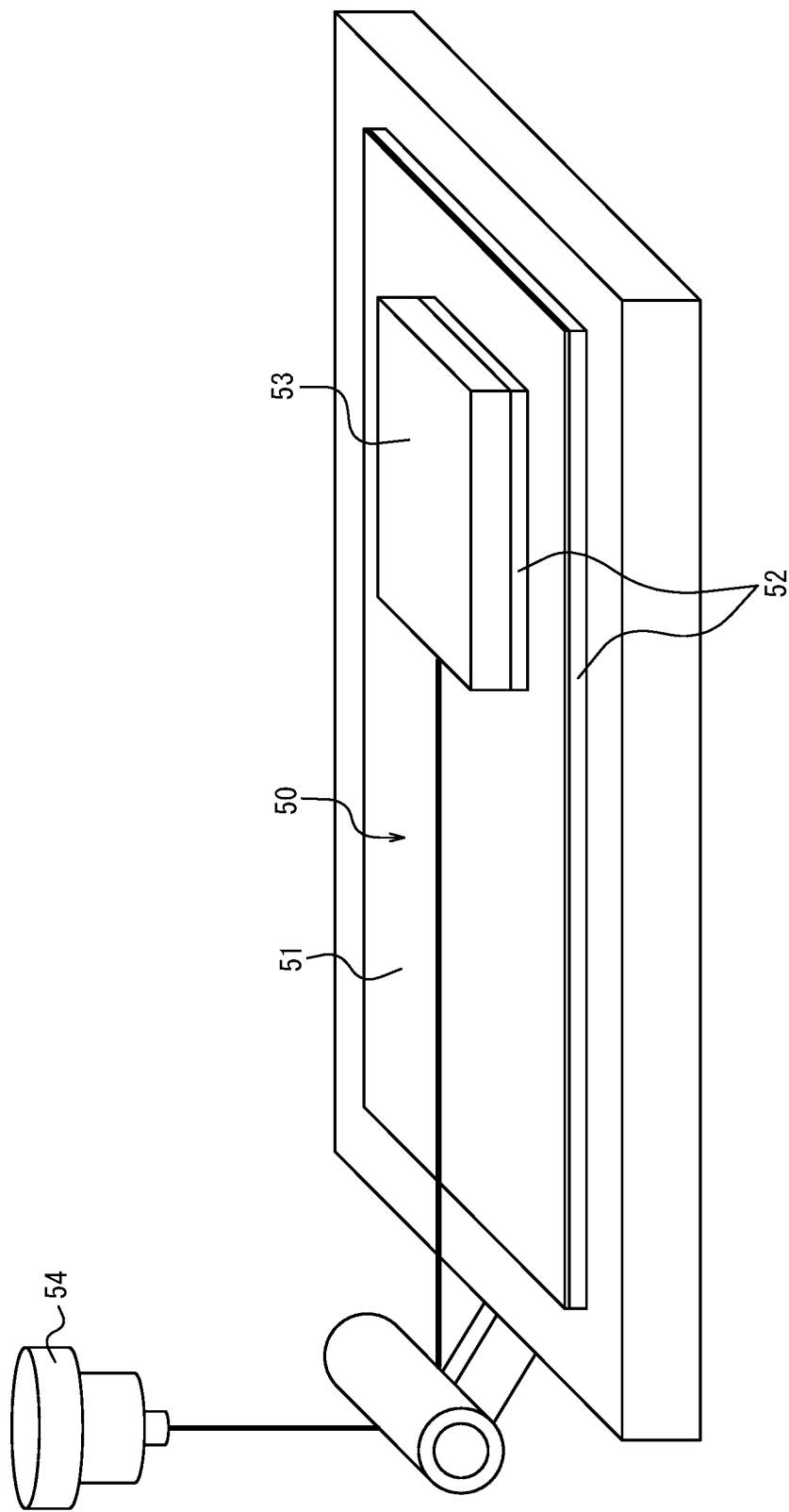
FIG. 7 is a perspective view schematically illustrating a procedure of measuring the coefficient of dynamic friction of a resin adhesive part.

Initially, a sliding piece (weight: 1.96 N) having dimensions of 63 mm×63 mm was bonded to a sheet of carton paper (having dimensions of 63 mm×63 mm manufactured by Oji Materia Co., Ltd. under the trade mane of OK ball, and having a basis weight of 230 $g/m^2$) with the double-sided adhesive tape manufactured by NICHIBAN Co., Ltd. under the trade name of NICETACK NW-15S. Then, as illustrated in FIG. 7, the resultant laminated body of the carton paper 52 and the sliding piece 53 was placed on a laminated body 50 (including the first laminate, the resin adhesive part 51, and the sheet of carton paper 52 serving as a base material) prepared in each of the examples and comparative examples so that the sheet of carton paper 52 in the laminated body and the resin adhesive part 51 in the laminated body 50 were in contact with each other. The dynamic frictional force was then measured by pulling the sliding piece 53 in the horizontal direction at a speed of 500 mm/minute using a pull tester provided with a load cell 54 (manufactured by Shimadzu Corporation under the trade name of Autograph AG-IS; the entire pulling tester is not illustrated) in the environment of 23° C. and 50% RH, and the coefficient of dynamic friction was calculated from the following expression:

Coefficient of dynamic friction (−)=dynamic frictional force (N)/1.96 (N)

<Tack Force>

The tack force of a resin adhesive part was measured using a probe tack tester (manufactured by RHESCA Co., LTD under the trade name of TAC1000). Specifically, the flat probe tip of φ 10 mm was pressed against the resin adhesive part side of the first laminate (including the resin adhesive part and the sheet of carton paper serving as a base material) under a load of 0.5 N for 5 seconds in the environment of 23° C. and 50% RH, and the force required to detach the probe from the resin adhesive part of the laminate at a speed of 15 mm/minute was measured and used as the tack force of the resin adhesive part.

<Proportion of Silicone-Based Surface Modifier Contained Resin Adhesive Part>

A resin adhesive part was subjected to an extraction operation by impregnating the resin adhesive part into hexane for 8 hours under a condition of 60° C., and a $^1$H-NMR measurement was carried out using deuterated chloroform free of tetramethylsilane (TMS) as a reference material. A calibration curve was prepared from the obtained measurement results based on the ratio of the intensity of residual CHCl in deuterated chloroform to the intensity of $CH_3$—Si derived from the silicone, and the amount (%) of the silicone-based surface modifier contained in 100% of the resin adhesive part was quantified.

<Adhesiveness Between Resin Adhesive Parts>

Resin adhesive parts of a package in the opened state prepared in each of the examples and comparative examples were manually brought into contact, and an evaluation was made according to the following criteria.

A: The resin adhesive parts were adhered to each other sufficiently when they were brought into the contact without applying any pressure.

B: The resin adhesive parts were adhered to each other when an additional pressure was applied after they were brought into the contact.

C: The resin adhesive parts were adhered to each other weakly when an additional pressure was applied after they were brought into the contact.

D: The resin adhesive parts were not adhered to each other even when an additional pressure was applied after they were brought into the contact.

<Openability>

A pair of resin adhesive parts of a package in the closed state prepared in each of the examples and comparative examples were brought into contact with each other. The resin adhesive parts were then manually separated, and an evaluation was made according to the following criteria.

A: The pair of resin adhesive parts were easily separated from each other, and a sound was heard upon the separation (when the package was opened) (the sensory impression upon the opening of the package was good).

B: The pair of resin adhesive parts were easily separated from each other, but no sound was heard upon the separation (when the package was opened) (the sensory impression upon the opening of the package was inferior to cases where a sound was heard).

C: Separating the pair of resin adhesive parts was slightly difficult, requiring some force.

D: Separating the pair of resin adhesive parts was difficult, and the package was broken in an attempt to separate the resin adhesive parts by applying a force.

<Resistance Against Sticking of Materials to Resin Adhesive Parts>

Cut tobacco leave were sprinkled from the top toward the resin adhesive part in an obtained first laminate (including the resin adhesive part and the sheet of carton paper serving as a base material). The first laminate was tapped from the side of the sheet of carton paper, and an evaluation was made according to the following criteria. It is to be noted that the tobacco leaves merely examples of possible materials which are prone to stick to resin adhesive parts, and the package of the present disclosure is not limited to a package for tobacco or cigarettes.

A: No tobacco leaves (materials) remained stuck to the resin adhesive part.

B: Some tobacco leaves (materials) remained stuck to the resin adhesive part, but they could be easily removed.

C: Tobacco leaves (materials) remained stuck to the resin adhesive part, and their removal was somewhat difficult.

D: Tobacco leaves (materials) remained stuck to the resin adhesive part, and they could not be removed.

Example 1

<Preparation of Resin Composition>

To a mixing vessel, 100 parts of an ultraviolet curable urethane acrylate-based resin A (having a storage modulus E' of 0.6 MPa at 25° C. and Tg of −23° C.) as the resin, 10 parts of trimethylolpropane triacrylate as the curing agent, and 0.1 parts of a polyether-modified polydimethylsiloxane (manufactured by BYK Additives & Instruments) as the silicone-based surface modifier were charged, and were stirred with a magnetic stirrer for 5 minutes to obtain a resin composition.

<Preparation of First Laminate Composed of Resin Adhesive Part and Base Material (Carton Paper)>

The resin composition obtained as described above was applied by a wire bar on a sheet of carton paper (having a thickness of 285 μm, manufactured by Oji Materia Co., Ltd. under the trade mane of OK ball, and having a basis weight of 230 g/m$^2$) as the base material. The substrate having the resin composition applied thereon was placed in a conveyor UV irradiation device (manufactured by EYE GRAPHICS Co., Ltd.) under the conditions of a lamp power of a high pressure mercury lamp set to 2 KW and a conveyor speed set to 9 m/minute. The resin composition was irradiated with ultraviolet rays to cure the resin composition on the base material to produce a laminate including a resin adhesive part (resin adhesive layer) having a thickness of 25 μm on the base material. It is to be noted that nitrogen was purged in this step to reduce the oxygen concentration in the device to 500 ppm or lower so that the reaction was not inhibited by oxygen in the air.

<Preparation of Second Laminate Composed of Resin Adhesive Part and Base Material (PET Film Having Corona-Treated Surface)>

The resin composition obtained as described above was applied by a wire bar on a polyethylene terephthalate (PET) film having a corona-treated smooth surface serving as a base material (having a thickness of 50 μm, manufactured by Unitika Ltd. under the trade name of S-50). The substrate having the resin composition applied thereon was placed in the conveyor UV irradiation device (manufactured by EYE GRAPHICS Co., Ltd.) under the conditions of a lamp power of the high pressure mercury lamp set to 2 KW and a conveyor speed set to 9 m/minute. The resin composition was irradiated with ultraviolet rays to cure the resin composition on the base material to produce a laminate including a resin adhesive part (resin adhesive layer) having a thickness of 25 μm on the base material. It is to be noted that nitrogen was purged in this step to reduce the oxygen concentration in the device to 500 ppm or lower so that the reaction was not inhibited by oxygen in the air.

<Production of Package>

The resultant second laminate was then used to produce a package having a shape similar to that of the package 100 illustrated in FIG. 1. Specifically, the base material side of a second laminate obtained as described above was bonded to a predetermined position of each of a main body and a lid each made of paper, with the double-sided adhesive tape (manufactured by NICHIBAN Co., Ltd. under the trade name of NICETACK NW-15S) to produce a package.

Examples 2 and 3

A resin composition, laminates, and a package were prepared in the same manner as in Example 1 except that the amount of the polyether-modified polydimethylsiloxane used was changed to 0.2 parts (Example 2) or 0.4 parts

Example 3) upon preparing the resin composition, and measurements and evaluations were made.

Example 4

A resin composition, laminates, and a package were prepared in the same manner as in Example 2 except that the amount of trimethylolpropane triacrylate used was changed to 7 parts and an acrylic group-containing polyether-modified polydimethylsiloxane (manufactured by BYK Additives & Instruments) was used instead of the polyether-modified polydimethylsiloxane upon preparing the resin composition, and measurements and evaluations were made.

Examples 5 and 6

A resin composition, laminates, and a package were prepared in the same manner as in Example 4 except the amount of trimethylolpropane triacrylate used was changed to 10 parts (Example 5) or 12 parts (Example 6) upon preparing the resin composition, and measurements and evaluations were made.

Example 7

A resin composition, laminates, and a package were prepared in the same manner as in Example 2 except that the amount of trimethylolpropane triacrylate used was changed to 15 parts upon preparing the resin composition, and measurements and evaluations were made.

Example 8

A resin composition, laminates, and a package were prepared in the same manner as in Example 7 except that a trimethylolpropane ethylene oxide modified triacrylate was used instead of trimethylolpropane triacrylate upon preparing the resin composition, and measurements and evaluations were made.

Example 9

A resin composition, laminates, and a package were prepared in the same manner as in Example 2 except that an ultraviolet curable urethane acrylate-based resin B (having a storage modulus E' of 3.5 MPa at 25° C. and Tg of 0.6° C.) was used instead of the ultraviolet curable urethane acrylate-based resin A upon preparing the resin composition, and measurements and evaluations were made.

Comparative Examples 1 and 2

A resin composition, laminates, and a package were prepared in the same manner as in Example 2 except that the amount of trimethylolpropane triacrylate used was changed to 5 parts (Comparative Example 1) or 20 parts (Comparative Example 2) upon preparing the resin composition, and measurements and evaluations were made.

Comparative Examples 3 and 4

A resin composition, laminates, and a package were prepared in the same manner as in Example 2 except that the amount of the polyether-modified polydimethylsiloxane used was changed to 0.02 parts (Comparative Example 3) or 0.8 parts (Comparative Example 4) upon preparing the resin composition, and measurements and evaluations were made.

Comparative Example 5

<Preparation of Resin Composition>

To mixing vessel, 100 parts of an acrylic acid ester copolymer resin, 5 parts of a carbodiimide-based crosslinking agent (manufactured by Nisshinbo Chemical Inc. under the trade name of CARBODILITE® E-02, CARBODILITE is a registered trademark in Japan, other countries, or both), and 3.5 parts of a water dispersion of titanium oxide (manufactured by DIC CORPORATION under the trade name of DISPERSE WHITE HG-701) were charged, and were stirred with a disperser. Next, while the mixture was continued to be stirred, 6 parts of a foam stabilizer (a 1/1 (in mass ratio) mixture of: a mixture of an amphoteric compound of alkyl betaine, and fatty acid alkanolamide (manufactured by DIC CORPORATION under the trade name of DICNAL M-20)/a sulfonic acid-type anionic surfactant (manufactured by DIC CORPORATION under the trade name of DICNAL M-40) and 0.6 parts of ammonia water were added. Finally, 4.5 parts of a thickener (a carboxylic acid-modified acrylic acid ester polymer, B-300K manufactured by Toagosei Co., Ltd.) was added, and the resultant was filtered through 150 mesh. Lastly, ammonia was added to adjust the viscosity to 5000 mPa·s, and a resin composition was obtained.

This resin composition was stirred with a beater, to be whipped so that the foaming magnification was 1.6 times. Further, stirring was continued for 5 minutes at a lower stirring speed to yield a formed resin composition.

<Preparation of Laminate Composed of Resin Adhesive Part and Base Material>

The foamed resin composition obtained as describe above was applied onto a polyethylene terephthalate film (50 μm in thickness) serving as a base material using a 0.3-mm applicator. The resultant was placed into a drying oven, and kept at 80° C. for 1.33 minutes; at 120° C. for 1.33 minutes; and at 140° C. for 1.33 minutes, to dry-crosslink the resin composition. A laminate having a resin adhesive part (resin adhesive layer) having a thickness of 180 μm on the base material was obtained. Measurements and evaluations were made using this laminate.

In making evaluations similar to those in Example 1 for Comparative Example 5, laminates each composed of the resin adhesive part and the base material (polyethylene terephthalate film) which were obtained as described above were used in place of the first laminate and the second laminate in Example 1.

<Production of Package>

The resultant laminate was then used to produce a package having a shape similar to that of the package 100 illustrated in FIG. 1. Specifically, the base material side of the laminate obtained as described above was bonded to a predetermined position of each of a main body and a lid which each made of paper, with the double-sided adhesive tape (manufactured by NICHIBAN Co., Ltd. under the trade name of NICETACK NW-15S) to produce a package. Evaluations were made using this package.

TABLE 1

| | | | Example 1 | Example 2 | Example 3 | Example 4 | Example 5 | Example 6 | Example 7 |
|---|---|---|---|---|---|---|---|---|---|
| Resin composition | Resin | Urethane acrylate-based resin A (parts by mass) | 100 | 100 | 100 | 100 | 100 | 100 | 100 |
| | | Urethane acrylate-based resin B (parts by mass) | — | — | — | — | — | — | — |
| | | Acrylic acid ester copolymer resin (parts by mass) | — | — | — | — | — | — | — |
| | Curing agent | Trimethylolpropane triacrylate (parts by mass) | 10 | 10 | 10 | 7 | 10 | 12 | 15 |
| | | Trimethylolpropane ethylene oxide modified triacrylate (parts by mass) | — | — | — | — | — | — | — |
| | | Carbodiimide-based crosslinking agent (parts by mass) | — | — | — | — | — | — | — |
| | Silicone-based surface modifier | Polyether polydimethylsiloxane (parts by mass) | 0.1 | 0.2 | 0.4 | — | — | — | 0.2 |
| | | Acrylic groupcontent polyether modification polydimethylsiloxane (parts by mass) | — | — | — | 0.2 | 0.2 | 0.2 | — |
| Resin adhesive part | | Proportion of silicone-based surface modifier (% by mass) | 0.09 | 0.18 | 0.38 | 0.19 | 0.18 | 0.18 | 0.17 |
| | | 90-degree peel force (N) | 0.06 | 0.052 | 0.043 | 0.064 | 0.052 | 0.034 | 0.030 |
| | | Coefficient of dynamic friction (—) | 0.95 | 0.71 | 0.55 | 0.80 | 0.69 | 0.53 | 0.36 |
| | | Tack force (N) | 1.10 | 1.11 | 1.00 | 1.55 | 1.01 | 0.91 | 0.70 |
| Evaluations | | Adhesion between resin adhesive parts | B | B | B | B | B | A | B |
| | | Openability | B | B | B | B | B | A | B |
| | | Resistance against sticking of materials to resin adhesive part | B | B | B | B | B | A | B |

TABLE 2

| | | | Example 8 | Example 9 | Comp. Ex. 1 | Comp. Ex. 2 | Comp. Ex. 3 | Comp. Ex. 4 | Comp. Ex. 5 |
|---|---|---|---|---|---|---|---|---|---|
| Resin composition | Resin | Urethane acrylate-based resin A (parts by mass) | 100 | — | 100 | 100 | 100 | 100 | — |
| | | Urethane acrylate-based resin B (parts by mass) | — | 100 | — | — | — | — | — |
| | | Acrylic acid ester copolymer resin (parts by mass) | — | — | — | — | — | — | 100 |
| | Curing agent | Trimethylolpropane triacrylate (parts by mass) | — | 10 | 5 | 20 | 10 | 10 | — |
| | | Trimethylolpropane ethylene oxide modified triacrylate (parts by mass) | 15 | — | — | — | — | — | — |
| | | Carbodiimide-based crosslinking agent (parts by mass) | — | — | — | — | — | — | 5 |
| | Silicone-based surface modifier | Polyether polydimethylsiloxane (parts by mass) | 0.2 | 0.2 | 0.2 | 0.2 | 0.02 | 0.8 | — |
| | | Acrylic groupcontent polyether modification polydimethylsiloxane (parts by mass) | — | — | — | — | — | — | — |
| Resin adhesive part | | Proportion of silicone-based surface modifier (% by mass) | 0.18 | 0.18 | 0.19 | 0.19 | 0.01 | 0.77 | 0 |
| | | 90-degree peel force (N) | 0.058 | 0.045 | 0.115 | 0.001 | 0.07 | 0.008 | 3.570 |
| | | Coefficient of dynamic friction (—) | 0.58 | 0.38 | 1.21 | 0.28 | 2.17 | 0.60 | 2.30 |
| | | Tack force (N) | 1.30 | 1.03 | 1.94 | 0.45 | 1.10 | 1.03 | 7.52 |
| Evaluations | | Adhesion between resin adhesive parts | B | B | A | D | B | D | A |
| | | Openability | B | B | C | B | B | B | D |
| | | Resistance against sticking of materials to resin adhesive part | B | B | D | B | D | B | C |

It can be acknowledged from Tables 1 and 2 that the packages in Examples 1 to 9 including the pair of resin adhesive parts wherein the 90-degree peel forces between the resin adhesive parts adhered to each other were equal to or greater than the predetermined value and the coefficients of dynamic friction and the tack forces were equal to or smaller than their respective predetermined values could be favorably closed by bringing the pair of resin adhesive parts into contact with each other. Further, sticking of materials to each resin adhesive part was prevented. It also can be acknowledged that the packages in Examples 1 to 9 could be brought into the opened state by easily separating the pair of resin adhesive parts in contact with each other.

In contrast, in Comparative Example 1 in which the tack force of the resin adhesive parts exceeded the predetermined value, the package was somewhat difficult to be opened and sticking of materials to the resin adhesive part could not be prevented.

Further, in Comparative Example 2 in which the 90-degree peel force between the pair of resin adhesive parts adhered to each other was equal to or smaller than the predetermined value, the resin adhesive parts did not come into close contact with each other and the package was difficult to be closed even when an additional pressure was applied after they were brought into the contact.

It can also be acknowledged that, in Comparative Example 3 in which the coefficients of dynamic friction of the resin adhesive parts exceeded the predetermined value, sticking of materials to the resin adhesive part could not be prevented.

Further, in Comparative Example 4 in which the 90-degree peel force between the pair of resin adhesive parts adhered to each other was equal to or smaller than the predetermined value, the resin adhesive parts did not come into close contact with each other and the package was difficult to be closed even when an additional pressure was applied after they were brought into the contact.

Further, in Comparative Example 5 in which the coefficients of dynamic friction and the tack forces of the resin adhesive parts exceeded the respective predetermined values, sticking of materials to the resin adhesive part could not be prevented.

INDUSTRIAL APPLICABILITY

According to the present disclosure, it is possible to provide a package which enables repeated opening and sealing of an opening, and can be favorably closed by bringing a pair of resin adhesive parts into contact with each other while preventing sticking of materials to each resin adhesive part.

REFERENCE SIGNS LIST

100, 200, 300, 400, 500 Package
10 Main body
10a Front wall
10b Back wall
10c Side edges
10d Bottom edge
11 Opening
12 Upper edge
13 Collar
13a Inner front wall
13b Inner side wall
13c Outer front wall
13d Outer side wall
14 Rotation piece
15 Internal space
20 Lid
20a Front wall
20b Upper wall
30 Resin adhesive part
40 Wrap film
50 Laminate
51 Resin adhesive part
52 Carton paper
53 Sliding piece
54 Load cell

The invention claimed is:

1. A package comprising:
   a main body having an internal space and an opening in communication between the internal space and an outside; and
   a pair of resin adhesive parts disposed so as to be capable of being brought into contact with each other for sealing the opening,
   a 90-degree peel force between the pair of resin adhesive parts adhered to each other being 0.02 N or more, a coefficient of dynamic friction of each of the two resin adhesive part configuring the pair of resin adhesive parts being 1.50 or less, and a tack force of each of the two resin adhesive part configuring the pair of resin adhesive parts being 1.60 N or less.

2. The package according to claim 1, wherein the resin adhesive parts are made of a cured product of a resin composition comprising a resin, a curing agent capable of curing the resin, and a silicone-based surface modifier.

3. The package according to claim 2, wherein a content of the silicone-based surface modifier in the resin composition is 0.05 parts by mass or more and 0.6 parts by mass or less per 100 parts by mass of the resin.

4. The package according to claim 2, wherein the silicone-based surface modifier is a polydimethylsiloxane-based surface modifier.

5. The package according to claim 1 further comprising a lid,
   wherein one resin adhesive part of the pair of resin adhesive parts is disposed on a surface of the main body, and the other resin adhesive part is disposed on a surface of the lid.

6. The package according to claim 1, wherein both of the two resin adhesive parts configuring the pair of resin adhesive parts are disposed on the surface of the main body.

7. The package according to claim 1, wherein the package is a package for tobacco or cigarettes, a package for confectionery, a package for coffee beans or powders, a package for tea leaves, or a package for detergent.

* * * * *